US006513204B2

(12) United States Patent
Rivera et al.

(10) Patent No.: US 6,513,204 B2
(45) Date of Patent: Feb. 4, 2003

(54) FLEXIBLE FLAT TENSION MEMBER TERMINATION DEVICE

(75) Inventors: James A. Rivera, Bristol, CT (US); Richard J. Ericson, Southington, CT (US); Leroy H. Favrow, Newington, CT (US); John Wesson, Vernon, CT (US)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 10/023,609

(22) Filed: Dec. 18, 2001

(65) Prior Publication Data

US 2002/0042973 A1 Apr. 18, 2002

Related U.S. Application Data

(62) Division of application No. 09/476,964, filed on Jan. 11, 2000.

(51) Int. Cl.[7] .......................... A44B 21/00; F16G 11/04

(52) U.S. Cl. ................ 24/136 R; 24/115 R; 24/115 M; 24/135 N; 24/136 L

(58) Field of Search ........................... 24/115 R, 136 R, 24/136 L, 135 N, 115 M

(56) References Cited

U.S. PATENT DOCUMENTS

| | | | | | |
|---|---|---|---|---|---|
| 375,871 | A | * | 1/1888 | Gillespie | 24/136 R |
| 607,892 | A | * | 7/1898 | Smith | 24/136 R |
| 975,790 | A | | 11/1910 | Pearson | |
| 1,006,900 | A | * | 10/1911 | Belser | 24/136 R |
| 1,011,423 | A | | 12/1911 | Gale, Sr. | |
| 1,035,230 | A | | 8/1912 | Pearson | |
| 1,164,115 | A | | 12/1915 | Pearson | |
| 1,457,029 | A | * | 5/1923 | Hazlett et al. | 24/136 R |
| 2,499,981 | A | * | 3/1950 | Strobel | 24/135 N |
| 3,220,743 | A | * | 11/1965 | Knapp | 24/115 R |
| 4,250,734 | A | * | 2/1981 | Tinsley | 24/136 R |
| 4,570,753 | A | | 2/1986 | Ohta et al. | |
| 4,718,788 | A | * | 1/1988 | Briscoe | 24/136 R |
| 5,112,933 | A | | 5/1992 | O'Donnell et al. | |
| 5,526,552 | A | | 6/1996 | De Angelis | |
| 5,566,786 | A | | 10/1996 | De Angelis et al. | |
| 5,855,254 | A | | 1/1999 | Blochle | |
| 6,145,443 | A | * | 11/2000 | Gabriel et al. | 24/115 R |

FOREIGN PATENT DOCUMENTS

| | | |
|---|---|---|
| DE | 23 33 120 | 1/1975 |
| DE | 36 23 407 | 1/1988 |
| FR | 2 293 392 | 7/1976 |
| GB | 1 362 514 | 8/1974 |
| GB | 1 401 197 | 7/1975 |
| JP | 1-266341 | 10/1989 |
| JP | 3-3883 | 1/1991 |
| JP | 5-39180 | 2/1993 |
| JP | 8-259144 | 10/1996 |
| JP | 10-167619 | 6/1998 |
| SU | 700 415 | 7/1986 |
| SU | 1216120 A | 7/1986 |
| WO | WO 98/29326 | 7/1998 |
| WO | WO 98/29327 | 7/1998 |

OTHER PUBLICATIONS

Hanover Fair (1998) Jan. 1998; three pages.

* cited by examiner

*Primary Examiner*—Victor Sakran

(57) ABSTRACT

A termination device for terminating a flexible flat tension member includes a socket and two opposing wedges mounted therein. One of the wedges is preferably pinned within the socket while the other wedge is removable. The invention provides a reliable termination with a safety back-up to retain the tension member even if friction in the device is reduced due to soiling with a friction reducing material.

12 Claims, 4 Drawing Sheets

FLEXIBLE FLAT TENSION MEMBER TERMINATION DEVICE

This application is a divisional of U.S. patent application Ser. No. 09/476,964, entitled "Flexible Flat Tension Member Termination Device" filed Jan. 11, 2000.

TECHNICAL FIELD

The present invention relates to elevator systems. More particularly the invention relates to a termination for a flexible flat tension member.

BACKGROUND OF THE INVENTION

A conventional traction elevator system includes a car, a counterweight, two or more ropes (tension members) interconnecting the car and counterweights; terminations for each end of the ropes at the connection points with the car and counterweights, a traction sheave to move the ropes and a machine to rotate the traction sheave. The ropes have traditionally been formed of laid or twisted steel wire which are easily and reliably terminated by means such as compression terminations and potted terminations.

Compression type terminations for steel ropes of larger diameters (conventional steel elevator ropes) are extremely effective and reliable. The range of pressures placed on such terminations is reasonably broad without adverse consequence. Providing that the pressure applied is somewhere reasonably above the threshold pressure for retaining the ropes, the termination is effective.

With an industry trend toward flat ropes, those ropes having small cross-section cords and polymeric jackets, significantly more criticality is involved in effectively terminating the same. More specifically, the polymeric coating can creep to even 50% of its original thickness when subjected to pressure. Prior art knowledge which teaches one to exceed a threshold omits a critical parameter for a flexible flat tension member. Upper limits on compression are also important for such tension members.

Since current knowledge in the art of tension member terminations is less than sublime for flexible flat tension members due both to the small cord diameter and the jacket properties discussed above, the art is in need of a tension member terminating device which specifically optimizes terminations of the flexible flat tension members currently emerging in the field.

SUMMARY OF THE INVENTION

A flexible flat rope (tension member) termination device is disclosed herein which comprises a socket, the socket including a pair of pins, a load side bearing wall having a friction surface, and a cut side bearing wall having a friction surface. The socket defines an interior hollow sized to accept two wedges in an opposed position relative to one another which together provide compressive and frictional forces that are desirable for securing a flat rope therein, the flat rope is threaded from a load end of the termination device around a first wedge, then back downwardly around a second wedge and then upwardly to its end. The arrangement provides about 35 MPa of compressive force on the flat rope over an effective friction surface of about 75 square centimeters. No fasteners are necessary during site assembly thus speeding assembly time and reducing cost considerations while optimizing termination reliability. In order to increase the coefficient of friction of the device, the surfaces upon which the flat rope will make contact are preferably textured. By increasing friction through textured surfaces the compressive force necessary to secure the flat rope is lower. This is desirable to reduce creep and thus extend the useful service life of the flat rope.

In addition to the foregoing, the reduction in creep allows for monitoring of the condition of the flat rope using magnetic flux leakage or electrical conductivity. Since creep is effectively eliminated, grounding of the rope does not occur. Thus magnetic or electrical conductivity may be monitored from one end of the rope to the other end of the rope. Since losses due to grounding are eliminated in the above discussed termination, conductive readings of the strands of the rope will accurately reflect the condition of the strands.

In another embodiment of the invention, a pair of capstans are employed to provide the necessary frictionally compressional forces required to terminate a flexible flat rope. One capstan is fixed while a second capstan is moveable toward or away from the first capstan. The device may be used to terminate a tension member whose working end extends downwardly from the device or whose working end extends upwardly from the device.

BRIEF DESCRIPTION OF THE DRAWINGS

Referring now to the drawings wherein like elements are numbered alike in the several Figures

DETAILED DESCRIPTION OF THE INVENTION

Figure 1:
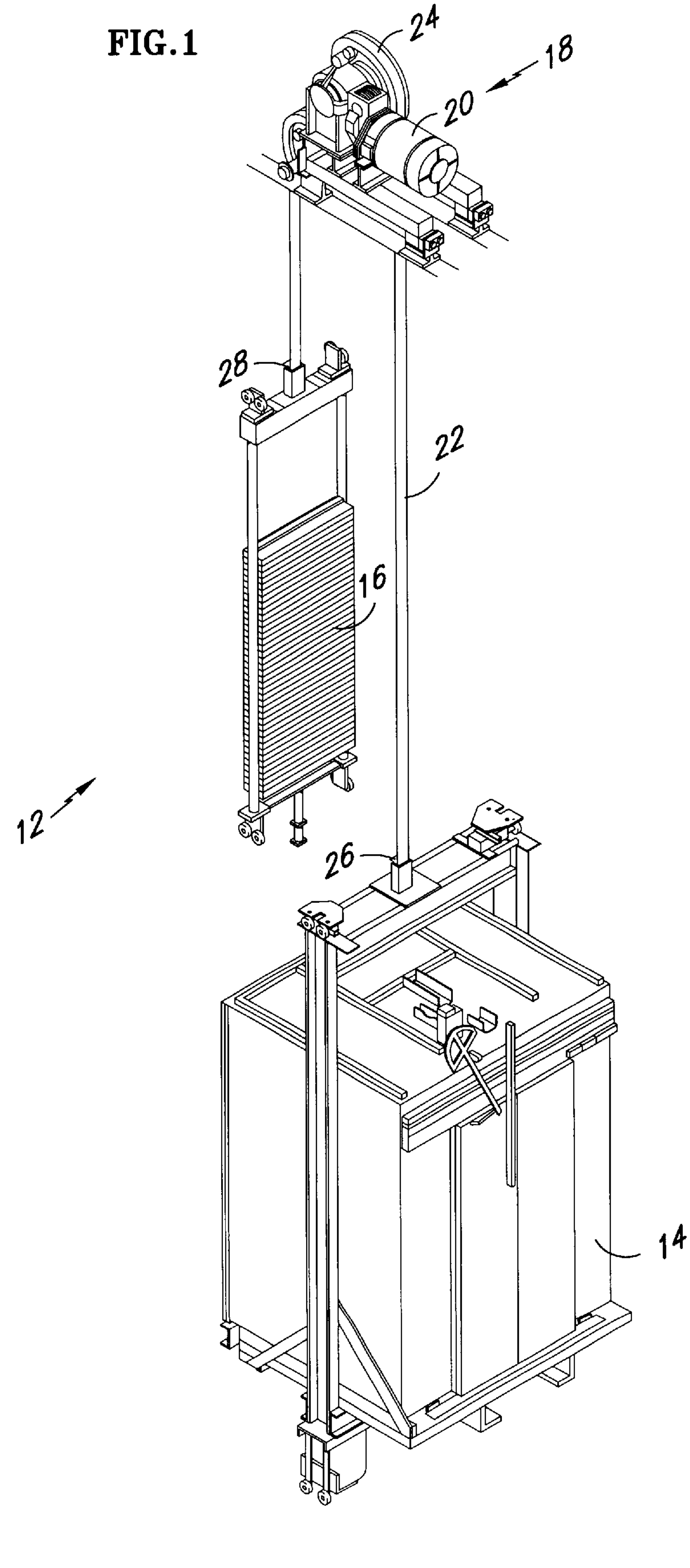
FIG. 1 is a perspective view of an elevator system.

Referring to FIG. 1, the relative location of the tension member termination device of the invention can be ascertained. For clarity, an elevator system 12 is illustrated having a car 14, a counterweight 16, a traction drive 18 and a machine 20. The traction drive 18 includes a tension member 22 interconnecting car 14 and counterweight 16 which member is driven by a sleeve 24. Both ends of tension member 22, i.e., a car end 26 and a counterweight end 28 must be terminated. It is either of these termination points for a flexible flat tension member with which the invention is concerned. An exemplary tension member of the type contemplated in this application is discussed in further detail in U.S. Ser. No. 09/031,108 filed Feb. 26, 1998 entitled Tension Member For An Elevator and U.S. Ser. No. 09/218,990 entitled Tension Member For An Elevator filed Dec. 22, 1998, both of which are entirely incorporated herein by reference. The elevator system depicted, is provided for exemplary purposes to illustrate the location of the device of the invention.

Figure 2:
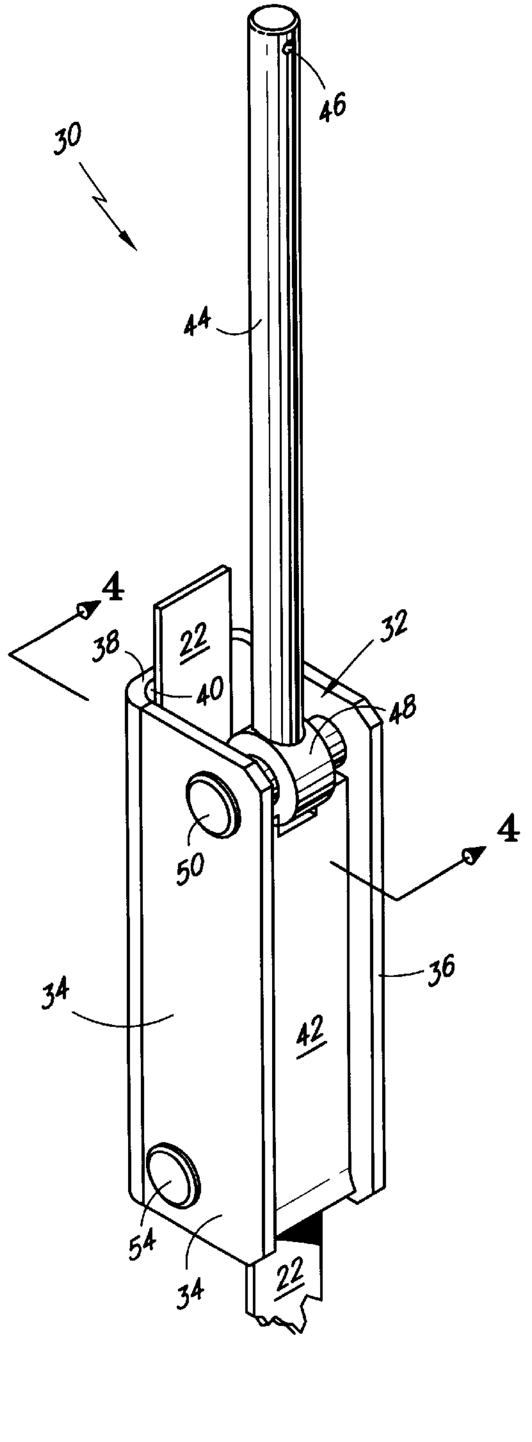
FIG. 2 is a perspective assembly view of the termination device of the invention.

Referring now to FIG. 2 a termination device 30 of the invention is illustrated. For point of reference, one of skill in the art will recognize tension member 22 which is visible at the bottom of the drawing figure and at the top of the drawing figure. The member is numbered at both places where it is visible for clarity. Tension member 22 is threaded through termination device 30 as will be discussed hereunder.

Termination device 30 comprises a socket 32 of a generally tubular shape which provides sides 34 and 36, a cut side plate 38, and a load side plate 42. Cut side plate 38 and load side plate 42 provide friction surfaces (40 at cut side plate 38 and not shown at load side plate 42). In a preferred construction of socket 32 of the invention, side 36, cut side plate 38 and load side plate 42 are manufactured as a unit to which side 34 is connectable by a pair of clevis pins 50 and 54. Preferably pins 50 and 54 each employ a cotter pin (not shown) to complete the assembly. One of ordinary skill in the art will recognize cotter pin holes 60 in pins 50 and 54. Socket 32 is thus held together between the heads of clevis pins 50 and 54 and the respective cotter pins.

Device 30 is supported by a support 44 having at an uphole end thereof a connector such as a pin hole 46 as shown. At a lower end of support 44 is a connector 48 which preferably is a sleeve as shown through which pin 50 is passable, said pin 50 being anchorable to socket 32 as illustrated. Any means of anchoring pin 50 to housing 32 is employable. It should be noted that the positioning of the pin 50 is selected to center the pin and thus the support 44 over the load side 52 of tension member 22 as is visible in FIG. 4. By centering pin 50 with load side 52 of tension member 22, device 30 is caused to hang straight and additional forces are not placed upon tension member 22.

The second pin 54 is provided to positionally secure a wedge through hole 55 and prevent one of the preferably two wedges employed herein from becoming unintentionally disassociated with socket 32. Hole 55 is preferably larger in diameter than pin 54 in order to allow wedge 56*b* to have play when pinned. The play is beneficial in that it facilitates self-centering of the wedge 56*b* with the balance of termination device 30. Self centering ensures a very effective termination while reducing the cost of manufacturing since tolerances of manufacture are not required to be as tight due to this self-centering feature.

Figure 4:
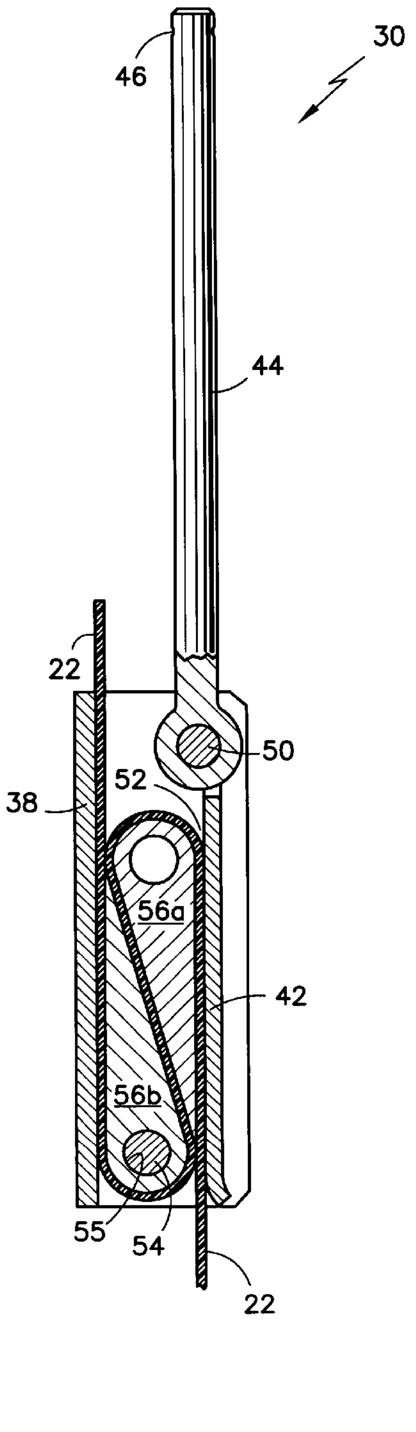
FIG. 4 is a cross-sectional view of the termination device of the invention taken along section line 4—4 in FIG. 2.
Figure 3:
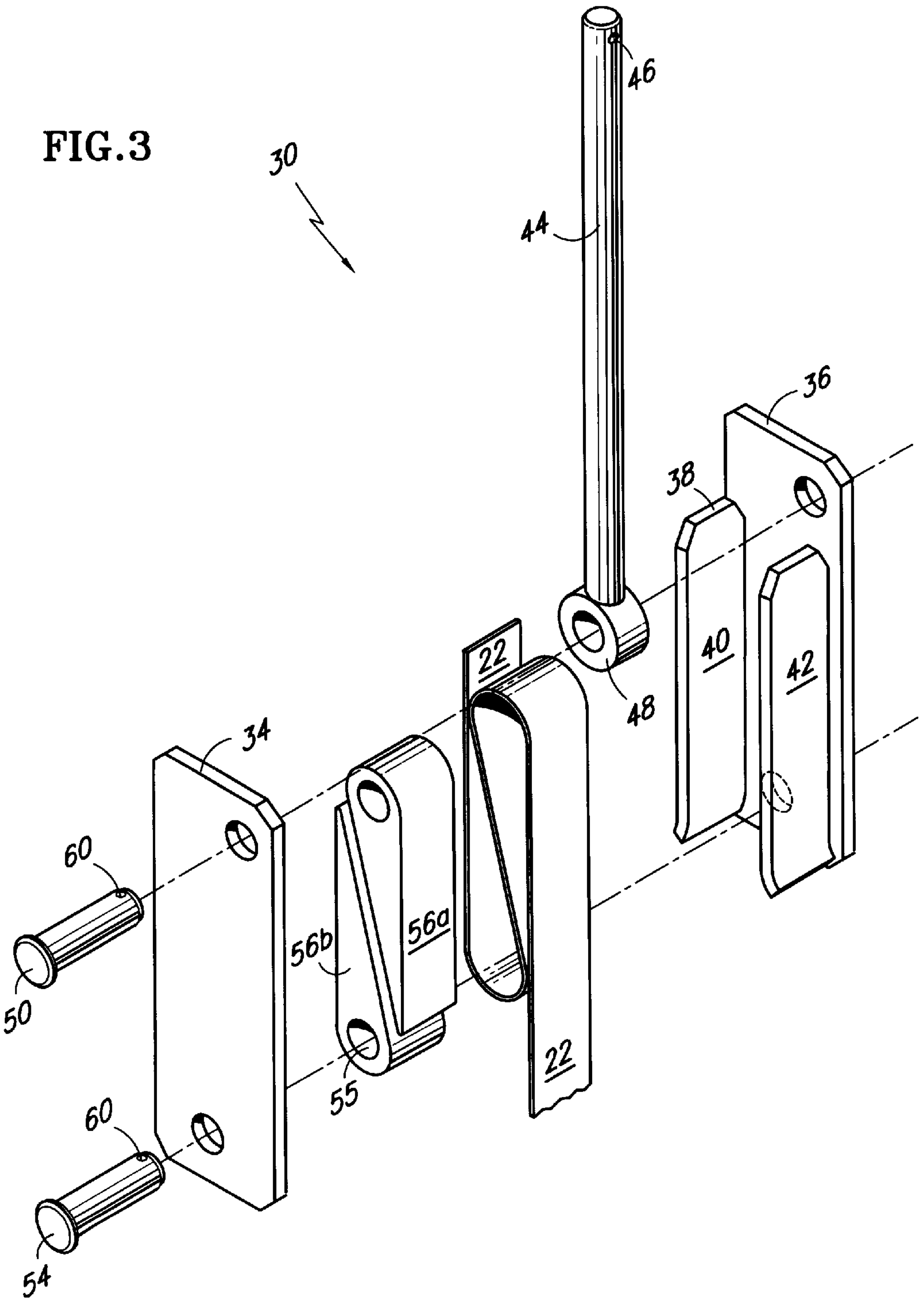
FIG. 3 is a perspective exploded view of the of the termination device of the invention.

Referring to FIG. 4, a wedge system of the invention employs preferably two wedges that are identical to one another (ease of manufacturing). Each wedge 56 is tear drop shaped in cross section and provides a contact surface for the tension member 22. Each angular surface of each wedge is preferably at about 15° from a centerline of each respective wedge. The curved portion of each wedge is preferably of a radius of 15 millimeters. The positioning of the two wedges in one preferred embodiment is well illustrated in FIG. 4. It will be appreciated that the load side plate 42 and cut side plate 38 are parallel to one another and that the function of the wedges is to urge tension member 22 against friction surfaces on plates 38 and 42.

In order to terminate tension member 22, one need merely thread the member 22 through the device 30 from the bottom (in the drawing) and around the wedges 56 as shown. Preferably at least about 200 millimeters of tension member 22 should extend out of the device 30 and beyond cut side plate 38. Once the wedges are "set" the termination is complete and will reliably and safely hold the elevator car.

It will be recognized by one of ordinary skill in the art that a single wedge 56*a* would be sufficient to reliably hold the elevator car as such single wedge systems currently are in existence. Single wedge systems typically employ friction surfaces for contact with a tension member which have a coefficient of friction of about 0.25. This coefficient of friction is easy to obtain by providing a textured surface and when provided in connection with the above-identified device allows for the termination to actually use only one of the two wedges. On occasion differing coefficients may be desired or may be imposed upon the system. In such low coefficient of friction situations a conventional single wedge termination might not be as desirable or desired. The invention, because of its greater surface area and opposed wedges 56*a* and 56*b* allows for the use of lower coefficient of friction surfaces, while still providing a reliable termination. Under normal circumstances all of the force of tension member 22 is reacted out by the time tension member 22 has wrapped completely around wedge 56*a*. In other words, there is no tension left in tension member 22 after the contact areas of wedge 56*a*. For this reason, wedge 56*b* plays a role only as a stop for wedge 56*a*. Alternatively, the invention provides a safety backup to ensure the tension member does not slip in conditions where the coefficient of friction has degraded to less than 0.25. This can occur if the friction surfaces of plates 38 and 42 become lubricated by any number of possible lubricants. In such event, tension still remaining in the tension member beyond the contact areas of wedge 56*a* because of the reduced friction is reacted out in wedge 56*b* and the socket remains serviceable.

In addition to ensuring a reliable termination, the invention also ensures that creep of the polymeric jacket material is not experienced. This is beneficial since it prevents grounding of the steel cords inside the polymeric jacket against the termination device 30. Therefore it is possible to monitor continuity, either electrically or magnetically, along the individual cords. If continuity is lost or degraded, cord damage would be suspected and repaired or the tension member replaced.

Figure 5:
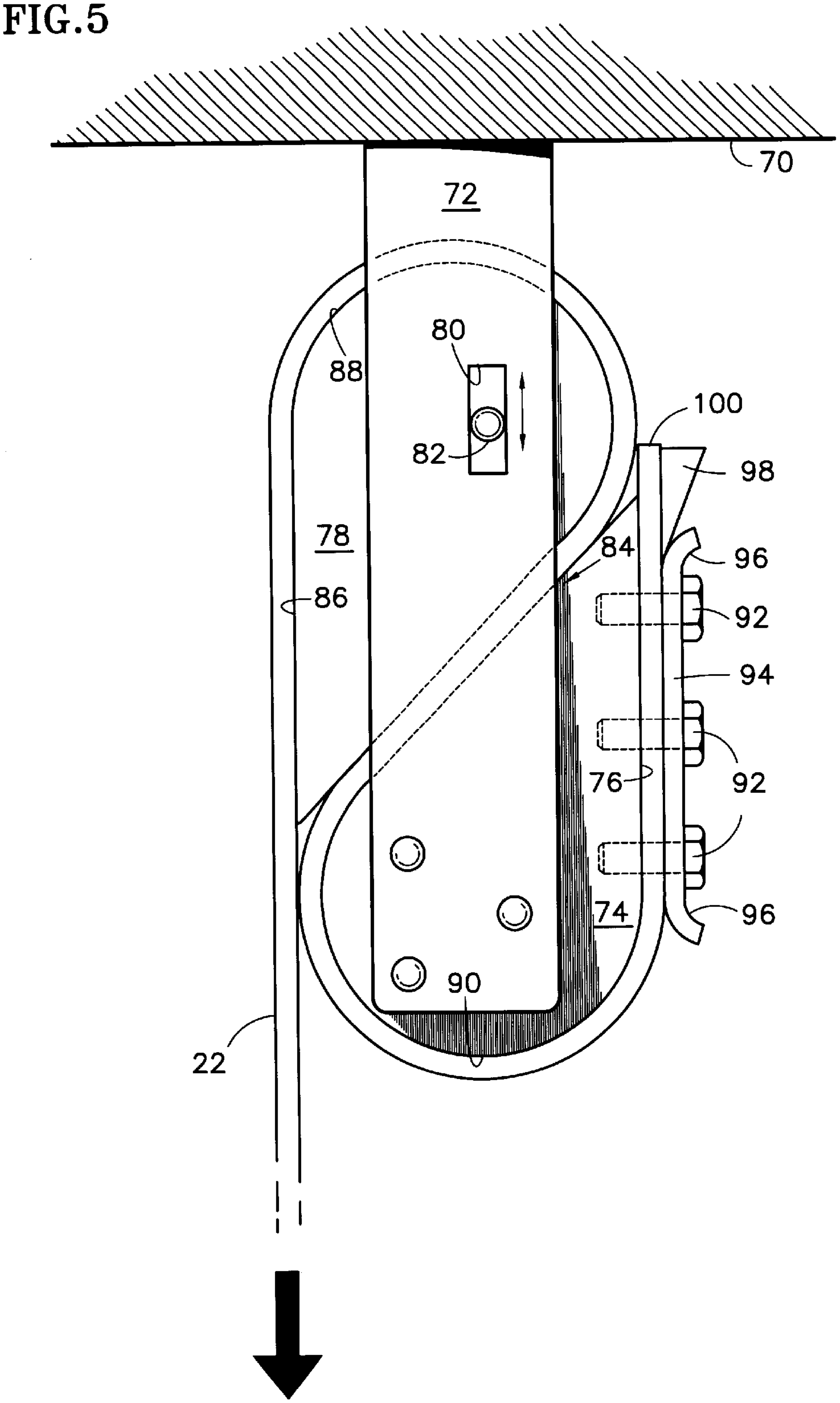
FIG. 5 is a side elevation view of a second embodiment of the invention.

Referring now to FIG. 5, a second embodiment of the invention is illustrated wherein a tension member is terminated by a device having the capability of being utilized as a termination device for a tension member having a working end extending upwardly or a termination device for a tension member having a working end extending downwardly. The device includes a frame 70 which is attachable either to the top of the hoistway (not shown) or to an elevator car (not shown) or counterweight (not shown). Fixedly attached to frame 70 is bracket 72 which preferably comprises two plate like members each attached to the frame only or attached to one another via, for example, forging, etc. At one end of bracket 72, a capstan 74 is fixedly attached thereto at a predetermined angle by any suitable mechanical affixation means. The desired angle will preferably include a positioning of one flat surface 76 of capstan 74 in a vertical position. A second capstan 78 is positioned adjacent first capstan 74 as illustrated but is not affixed to bracket 72. Rather second capstan 78 is allowed to slide within bracket 72 in groove 80 via a pin 82 extending from capstan 78. Groove 80 and the sliding of capstan 72 allows for simple insertion of a tension member 22 to terminate the same. The sliding provision of second capstan 78 also allows the weight of whatever object is suspended by tension member 22 to cause capstan 78 to move toward capstan 74. This is important with respect to the termination capability of the device of the invention since the tension member 22 being wrapped as shown in FIG. 5 is compressed in the area illustrated by arrow 84 between the two capstans.

It should be noted that the second capstan 78 will tend to find its own position within bracket 72 since it includes a complementary angle to that of capstan 74. Thus, it can be expected that surface 86 of capstan 78 will orient itself in a vertical position parallel to surface 76 of capstan 74. Tension member 22 is preferably wrapped over the curved section 88 of capstan 78 through the central area 84 between capstan 74 and capstan 78, around the curved section 90 of capstan 74 and up to an end termination on the flat surface 76 of capstan 74.

The tension member 22 is preferably bolted to capstan 74 by a plurality of threaded fasteners (bolts) 92, which preferably is six bolts. A plate 94 is used as a bolt seat and to compress tension member 22 against surface 76 of capstan 74. In a preferred embodiment, the plate 94 includes curved ends 96 to prevent injury to tension member 22.

In one preferred embodiment it is noted that a backup retaining device comprises a wedge 98 adhesively mounted to a terminal end 100 of tension member 22. Thus, in the extraordinarily unlikely event that the tension member began to slip through the termination device of this embodiment, the wedge 98 would be drawn into the confined space between bolt plate 94 and flat surface 76 of capstan 74 where it would wedge against tension member 22 and prevent further migration of the tension member 22 out of the termination device of this embodiment.

Although the invention has been shown and described with respect to exemplary embodiments thereof; it should be understood by those skilled in the art that various changes, omissions, and additions may be made thereto, without departing from the spirit and scope of the invention.

What is claimed is:

1. A tension member termination device comprising:

a first capstan;

a bracket fixedly supporting said first capstan; and a second capstan around which a tension member is at least partially wrapped when terminated by said device, said second capstan being slideably engaged within said bracket and moveable into close proximity with said first capstan with the tension member enclosed between said first and second capstans.

2. A tension member termination device as claimed in claim 1 wherein said first capstan is maintained in a fixed relationship with respect to said bracket whereby one surface of said first capstan is arranged in a parallel plane to the plane within which the tension member terminated by said device exists.

3. A tension member termination device as claimed in claim 2 wherein said second capstan is rotationally free to nest with a surface of said first capstan.

4. A tension member termination device as claimed in claim 1 wherein said first capstan further comprises a plurality of threaded fastener receptors.

5. A tension member termination device as claimed in claim 4 wherein said device further comprises:

a plurality of threaded fasteners connectable to said receptors; and a bolt plate securable to said first capstan by said plurality of threaded fasteners.

6. A tension member termination device as claimed in claim 5 wherein said device further includes a backup wedge attached to a tension member threaded through said device and positioned to jam between said bolt plate and said first capstan upon movement of said tension member.

7. A tension member termination device comprising:

a first capstan having a first engagement surface;

a bracket fixedly supporting said first capstan;

a second capstan having a curved section, for receiving a tension member at least partially wrapped around said second capstan, and a second engagement surface, said second capstan being slideably engaged within said bracket and moveable into close proximity with said first capstan with the tension member threaded between said first and second engagement surfaces.

8. The tension member termination device according to claim 7, wherein the curved section and engagement surfaces are located so that tension on the tension member causes said tension member to bear against said curved section, forcing said second engagement surface toward said first engagement surface with the tension member threaded between.

9. The tension member termination device according to claim 7, wherein said first engagement surface is fixed at an angle relative to said bracket, and said second capstan is permitted to rotate relative to said bracket.

10. A tension member termination assembly comprising:

a bracket;

a first capstan fixed to said bracket;

a second capstan slideably engaged within said bracket and moveable into close proximity with said first capstan; and a tension member partially wrapped around said second capstan and threaded between said first and second capstans.

11. The tension member termination assembly according to claim 10, wherein:

said first capstan comprises a first engagement surface, said second capstan comprises a second engagement surface facing the first engagement surface, and a curved surface, and said tension member is threaded between the first and second engagement surfaces and around the curved surface, and when tension is applied to said tension member said tension member bears against said curved surface and forces said second engagement surface toward said first engagement surface.

12. The tension member termination assembly according to claim 10, wherein said first engagement surface is fixed at an angle relative to said bracket, and said second capstan is permitted to rotate relative to said bracket.

* * * * *